US006686419B2

(12) United States Patent
Wouters et al.

(10) Patent No.: US 6,686,419 B2
(45) Date of Patent: Feb. 3, 2004

(54) MULTIMODAL ETHYLENE, ALPHA-OLEFIN AND DIENE POLYMERS, PROCESSES FOR MAKING AND DEVICES COMPRISING SUCH COMPOSITIONS

(75) Inventors: Guy Joseph Wouters, Brussels (BE); Periagaram S Ravishankar, Kingwood, TX (US); Kent L. Chasey, Houston, TX (US); Eric P. Jourdain, Rhode Saint Genese (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 16 days.

(21) Appl. No.: 10/360,973

(22) Filed: Feb. 7, 2003

(65) Prior Publication Data

US 2003/0162926 A1 Aug. 28, 2003

Related U.S. Application Data

(60) Provisional application No. 60/355,779, filed on Feb. 8, 2002.

(51) Int. Cl.$^7$ .................. C08L 47/00; C08F 236/20
(52) U.S. Cl. .................. 525/237; 525/53; 525/211; 524/554; 524/570; 526/65; 526/282; 526/336; 526/339
(58) Field of Search .............. 525/53, 211, 237; 524/554, 570; 526/65, 282, 336, 339

(56) References Cited

U.S. PATENT DOCUMENTS

| | | | |
|---|---|---|---|
| 3,681,306 A | 8/1972 | Wehner .................. 260/80.78 |
| 3,697,429 A | 10/1972 | Engel et al. ................ 252/59 |
| 3,718,632 A * | 2/1973 | Gardner et al. ......... 526/335 X |
| 3,884,993 A | 5/1975 | Gros .................... 260/897 |
| 4,016,342 A | 4/1977 | Wagensommer .............. 526/65 |
| 4,078,131 A | 3/1978 | de Zarauz .................... 526/20 |
| 4,306,041 A | 12/1981 | Cozewith et al. ............. 526/65 |
| 4,645,793 A | 2/1987 | Von Hellens et al. ........ 524/518 |
| 4,922,046 A | 5/1990 | Kinoshita et al. ............. 585/11 |
| 5,449,713 A | 9/1995 | Nakahama .................. 524/491 |
| 5,677,382 A | 10/1997 | Tsuji et al. ................. 525/237 |
| 5,686,529 A | 11/1997 | Srinivasan .................... 525/74 |
| 5,691,413 A | 11/1997 | Morikawa et al. ............. 525/99 |
| 5,698,650 A * | 12/1997 | Jourdain et al. ............. 526/283 |
| 5,904,220 A | 5/1999 | Shinichiro et al. .......... 180/300 |
| 6,040,351 A | 3/2000 | Okita et al. ................. 521/140 |
| 6,136,744 A | 10/2000 | Gillis et al. ................. 502/118 |
| 6,218,469 B1 | 4/2001 | Morizono et al. ............ 525/88 |
| 6,268,427 B1 | 7/2001 | Wang et al. ................. 524/504 |

FOREIGN PATENT DOCUMENTS

| | | | |
|---|---|---|---|
| EP | 0 446 380 | 9/1991 | ........ C08L/23/16 |
| EP | 0 532 764 | 10/1992 | ........ C08L/23/08 |
| EP | 0 564 267 A2 | 10/1993 | ........ C08L/23/16 |
| EP | 0 227 206 B2 | 1/1995 | ........ C08F/210/18 |
| EP | 0 704 484 A1 | 4/1996 | ........ C08L/23/16 |
| EP | 0 855 413 A1 | 7/1998 | ........ C08F/210/18 |
| EP | 1 186 631 A1 | 3/2002 | ........ C08L/23/16 |
| WO | WO 94/00500 | 1/1994 | ........ C08F/10/00 |
| WO | WO 97/00290 | 1/1997 | ........ C08L/23/16 |
| WO | WO 97/22639 | 6/1997 | ........ C08F/210/18 |
| WO | WO 98/02471 | 1/1998 | ........ C08F/210/18 |
| WO | WO 98/07769 | 2/1998 | ........ C08F/255/00 |
| WO | WO 99/45049 | 9/1999 | ........ C08F/297/08 |
| WO | WO 00/26296 | 5/2000 | ........ C08L/23/16 |

* cited by examiner

Primary Examiner—Fred Teskin (57) ABSTRACT

This invention relates generally to synthetic polymers, generally with improved balance of processability, resilience and durability. These polymers are generally of the ethylene, alpha-olefin, diene terpolymer type.

91 Claims, 3 Drawing Sheets

MULTIMODAL ETHYLENE, ALPHA-OLEFIN AND DIENE POLYMERS, PROCESSES FOR MAKING AND DEVICES COMPRISING SUCH COMPOSITIONS

This application claims the benefit of U.S. Provisional Application No. 60/355,779, filed Feb. 8, 2002, the entire disclosure of which is hereby incorporated by reference.

FIELD

This invention relates generally to multimodal ethylene, alpha-olefin and diene polymer compositions, processes for making them and to devices comprising such compositions. These compositions have been found to have an improved balance of processability, resilience and durability.

BACKGROUND

Elastomers useful in applications requiring high resilience have in general a high elasticity in the medium to high frequency range (typically between 5 and 600 rad/sec) which results in low loss tangent (tan δ), at temperatures ranging from approximately room temperature to over 100° C. Natural rubber is an elastomer of this type.

Ethylene elastomers contain sufficient copolymerised alpha-olefin to produce amorphous to semi-crystalline compounds of density generally below 0.9. In the class of ethylene based elastomers, such as EPDM elastomers, polymers of very high molecular weight (as measured by their Mooney viscosity) are usually required for high resilience applications. Although high molecular weight EPDM elastomers are commercially available, their inherently very high viscosity (Mooney viscosity in general greater than 200) creates difficulties in processability which requires them to be produced with the addition of extender oil to reduce their apparent viscosity. Very high molecular weight polymers are not only difficult to separate from their polymerization solvent without inducing significant macromolecular chain breakage, but they are difficult to mix and compound. The addition of extender oil to the elastomer eases processability in terms of production process recovery, elastomer mixing and compounding.

The required level of extender oil depends on the molecular weight of the elastomer, but is usually sufficient to reduce the apparent viscosity to a Mooney viscosity of about 100 or below. Typical extender oil level is in general in the range of from 10 to 150 phr. Commercially available very high molecular weight EPDMs which would be useful in high resilience applications contain from about 50 to about 125 phr extender oil.

Problems arise from the use of extender oil however. Elastomers extended with oil are limited in compounding latitude since they already contain a level and/or type of oil which may be undesirable in the compound recipe and restrict further compounding options. Furthermore, the extender oil simply acts as a processing aid and does not participate in the formation of a tight cross-link network upon vulcanization, which reduces the elasticity of the vulcanized compounds.

The elasticity of ethylene based elastomers can be increased by introducing long chain branches into their structure. This can be achieved using certain acidic transition metal catalysts, or through the use of dienes having two polymerizable double bonds such as norbornadiene, dicyclopentadiene, vinyl norbornene or alpha-omega dienes. However, a high level of branching is required for significantly improved elasticity, and such branching can result in polymers that are almost impossible to process without the use of extender oil as described above. Moreover, the presence of long chain branching adversely affects physical properties such as tear resistance, tensile strength and elongation.

Another method of increasing processability is to produce bimodal elastomers having a major fraction of lower molecular weight polymer (Mooney viscosity less than about 100) and a minor fraction of high molecular weight polymer (Mooney viscosity greater than 120), as in Exxon-Mobil Chemical's Vistalon™ Bimodal EPDM grades. However, these polymers tend to have an elasticity which is too low.

Among the more demanding applications for processable, highly elastic applications are vibration damping devices. Vibration damping devices are used to absorb vibrational energy generated by machines such as automobile, jet and other engines, air conditioners, vehicle exhaust systems and other dynamic devices that generate significant vibration during operation. Unless a damping device is used, this vibration is directly transmitted to support and surrounding structures. The result can range from annoying to destructive. The damping device should maintain its performance under a wide range of temperature and other environmental conditions and for a relatively long period of time.

Examples of vibration damping devices include formed shapes, mountings, harnesses, rings, bushings and belts used to isolate vibrators from what would otherwise be vibrated. While natural rubber is often used in vibration damping applications because it provides high resiliency and desirable physical properties like tear resistance, natural rubber does not last long under conditions of extreme heat (>120° C.) or ozone concentration such as is found in many automotive applications.

Despite years of research in this area there is still a need for economically produced synthetic materials that have an improved balance of processability, resilience and durability.

U.S. Pat. No. 3,884,993 describes the preparation of the blends via a parallel reactor process using traditional Ziegler-Natta catalysts. These blends have a maximum Mooney viscosity of 53 (1+8@121° C.) which corresponds to a Mooney viscosity of about 57 when measured at 1+4@125° C. even where the amount of high molecular weight fraction reaches approximately 58 weight percent. The low molecular weight fraction has an Mn below 25,000.

WO00/26296 discloses an ethylene-alpha olefin elastomeric composition made by a series reactor operation in which the high molecular weight component has a Mooney not exceeding 120 and is present in an amount no greater than 50 weight percent.

U.S. Pat. No. 4,078,131 describes blends of EPDM having components with differing average propylene contents. A wide range and variation of properties in the components is disclosed, but there is no disclosure of a blend comprising 50 weight percent or more of a high molecular weight fraction having a Mooney of over 120.

SUMMARY

In the invention a multiple reactor process may be used to produce an elastomer of high Mooney viscosity in one reactor, while a second reactor in series or parallel produces an elastomer of low Mooney viscosity which acts as an internal plasticizer for the high Mooney viscosity polymer component thereby producing an elastomer having an overall Mooney viscosity low enough to enable easy processing while maintaining normal compounding operations. The composition is solid, that is to say not fluid at room temperature, and substantially free of solvent. The composition can be formed into bales or pellets for subsequent processing, compounding and mastication.

In a polymer product aspect of the invention there is provided a multimodal elastomer including a fraction of high Mooney viscosity and a fraction of low Mooney viscosity which acts as an internal plasticizer for the high Mooney viscosity polymer fraction thereby producing an elastomer having a Mooney viscosity low enough to enable easy processing while maintaining normal compounding operations. The elastomeric nature of the internal plasticizing component allows it to participate in a cross-linked network upon vulcanization. Some forms of the invention may provide a polymer providing high resiliency and durability even under exposure to prolonged high temperature conditions.

In an elastomer compound aspect of the invention there is provided a formulation containing a polymer of the invention; conventional fillers, cross-linking and stabilizing additives, plasticizing oil and optionally other compounding ingredients. Compared to recipes containing high Mooney viscosity polymers extended with oil, the total amount of plasticizing oil in the recipe can be reduced.

In one embodiment the invention is a solid multimodal polymer composition comprising units derived from ethylene, alpha-olefin and diene, said polymer composition having a tan (δ) of 0.5 or less when measured at 125° C. and at a frequency of 10.4 rad/sec, and an overall Mooney viscosity of at least 60 (1+4@125° C.); said polymer comprising: at least 50 weight percent based on the total polymer weight of a first fraction having a Mooney viscosity of over 120 (1+4@125° C.); and from 5 to 50 weight percent based on the total polymer weight of a second fraction having a Mooney viscosity of 120 or less (1+4@125° C.) and a Mn of at least 3500 g/mol.

In another embodiment the invention is a solid multimodal polymer composition comprising units derived from ethylene, alpha-olefin and diene, said polymer composition having a tan (δ) of 0.5 or less when measured at 125° C. and at a frequency of 10.4 rad/sec, and an overall Mooney viscosity of at least 30 (1+4@125° C.); said polymer comprising: a) at least 60 weight percent based on the total polymer weight of a first fraction having a Mooney viscosity of over 120 (1+4@125° C.); and b) from 5 to 40 weight percent based on the total polymer weight of a second fraction having a Mooney viscosity of 120 or less (1+4@125° C.) and a Mn of at least 3500 g/mol.

In another embodiment the invention is a solid multimodal polymer 30 composition comprising units derived from ethylene, alpha-olefin and diene, said polymer composition having a tan (δ) of 0.5 or less when measured at 125° C. and at a frequency of 10.4 rad/sec, and an overall Mooney viscosity of at least 30 (1+4@125° C.); said polymer comprising: a) at least 50 weight percent based on the total polymer weight of a first fraction having a Mooney viscosity of over 120 (1+4@125° C.) and a molecular weight distribution of 3.0 or less; and b) from 5 to 50 weight percent based on the total polymer weight of a second fraction having a Mooney viscosity of 120 or less (1+4@125° C.), a molecular weight distribution of 3 or less, and a Mn of at least 25000.

In still another embodiment the invention is a multimodal polymer composition comprising from 40 to 90 mole percent ethylene derived units, from 0.2 to 5.0 mole percent non-conjugated diene derived units, and the remainder of the polymer units comprised of propylene derived units; said polymer composition being essentially free of oil additive and having a tan (δ) less than 0.5 when measured at 125° C. and at a frequency of 10.4 rad/sec, an overall Mooney viscosity of from 30 to 100(1+4@125° C.), a branching index of at least 0.7, and said polymer comprising: a) at least 50 weight percent based on the total polymer weight of a first fraction having a Mooney viscosity of over 120 (1+4@125° C.) and a molecular weight distribution of 3 or less; and b) from 5 to 50 weight percent based on the total polymer weight of a second fraction having a Mooney viscosity of 120 or less (1+4@125° C.), a Mn of at least 3500 and a molecular weight distribution of 3 or less; and wherein the amount (wt %) of ethylene derived units in the first and second fraction differ by no more than 20%.

In still another embodiment the invention is a multimodal polymer composition comprising units derived from ethylene, alpha-olefin and diene, said polymer composition having a tan (δ) of 0.5 or less when measured at 125° C. and at a frequency of 10.4 rad/sec, and an overall Mooney viscosity of at least 30(1+4@125° C.); said polymer comprising: a) at least 50 weight percent based on the total polymer weight of a first fraction (also referred to herein as fraction a)) having a Mooney viscosity of over 120 (1+4@125° C.); and b) from 5 to 50 weight percent based on the total polymer weight of a second fraction (also referred to herein as fraction b)) having a Mooney viscosity of 120 or less (1+4@125° C.) and a Mn of at least 3500 g/mol. In a particular aspect of any of the embodiments described herein, the composition has one or more of the following characteristics, in any combination:

a. the composition is solid;
  b. the composition has an overall Mooney viscosity of at least 60(1+4@125° C.);
  c. the composition has an overall Mooney viscosity of less than 100(1+4@125° C.);
  d. the composition has an overall Mooney viscosity of from 30 to 100 (1+4@125° C.);
  e. the composition comprises at least 60 weight percent based on the total polymer weight of a first fraction and from 5 to 40 weight percent based on the total polymer weight of a second fraction;
  f. the composition comprises at least 70 weight percent based on the total polymer weight of a first fraction and from 5 to 30 weight percent based on the total polymer weight of a second fraction;
  g. the first fraction has a Mooney viscosity of over 120 (1+4@125° C.);
  h. the first fraction has a Mooney viscosity of at least 175 (1+4@125° C.);
  i. the second fraction has a Mooney viscosity of 120 or less (1+4@125° C.);
  j. the second fraction has a Mooney viscosity below 50 (1+4@125° C.);
  k. the fraction a) and b) have a molecular weight distribution of 4 or less, preferably 3 or less;
  l. the fraction b) has a Mn above 3500 g/mol;
  m. the fraction b) has a Mn of at least 25000 g/mol;
  n. the composition comprises from 35, preferably 40, to 90 mole percent ethylene derived units, from 0.2 to 5.0 mole percent non-conjugated diene derived units, and the remainder of the polymer units derived from propylene;
  o. fraction a) comprises less than 78 wt %, preferably less than 72 wt % and especially less than 65 wt % of ethylene derived units based on the total weight of ethylene and alpha-olefin;

p. fractions a) and b) have a diene content less than 15 wt %, preferably less than 12 wt % and especially less than 10 wt % based on the total weight of ethylene, alpha-olefin, and diene;

q. the diene contents of fractions a) and b) differ by less than 8%, preferably less than 5 wt % and especially less than 3 wt %;

r. the polymer composition is essentially free of oil additive;

s. the polymer composition has a branching index of at least 0.7, preferably at least 0.8;

t. the amount (wt %) of ethylene derived units in fraction a) and b) differ by no more than 20%, preferably by no more than 10%;

u. the fraction b) has a Mv of at least 9000 g/mol;

v. the composition has a tan ($\delta$) of 0.45 or less, and is preferably between 0.1 and 0.4, when measured at 125° C. and at a frequency of 10.4 rad/sec; and w. the polymer composition contains less than 30, preferably less than 20, and especially less than 10 parts by weight oil per 100 parts by weight polymer.

In another embodiment the invention is a process, preferably a series reactor process, for the preparation of multimodal polymer composition comprising: contacting in a first reactor activated metallocene catalyst with ethylene, diene and propylene monomers thereby producing an effluent containing a first polymer component; feeding the effluent to a second reactor wherein activated metallocene catalyst is contacted with additional ethylene, diene and propylene monomers to produce a second polymer component and final product; and controlling conditions in each reactor in order to obtain a first polymer component having a Mooney viscosity of over 120 (1+4@125° C.) and a second polymer component having a Mooney viscosity of 120 or less (1+4@125° C.) and a Mn of at least 3500 g/mol, and the final product has tan ($\delta$) of 0.5 or less when measured at 125° C. and at a frequency of 10.4 rad/sec, has an overall Mooney viscosity of at least 30 (1+4@125° C.), and contains no more of the second polymer component than the first polymer component.

In another embodiment the invention is a vibration damping device comprising a multimodal polymer composition containing units derived from ethylene, alpha-olefin and diene, said polymer composition having a tan ($\delta$) of 0.5 or less when measured at 125° C. and at a frequency of 10.4 rad/sec, and an overall Mooney viscosity of at least 30 (1+4@125° C.); said polymer comprising a) at least 50 weight percent based on the total polymer weight of a first fraction having a Mooney viscosity of over 120 (1+4@125° C.); and b) from 5 to 50 weight percent based on the total polymer weight of a second fraction having a Mooney viscosity of 120 or less (1+4@125° C.) and a Mn of at least 3500 g/mol.

DETAILED DESCRIPTION

The polymer compositions of this invention comprise units derived from ethylene, alpha-olefin and diene. Such "EPDM-type" or "EODM" terpolymers are well known in the art. The alpha olefin is preferably one or more $C_3$ to $C_8$ alpha olefins, more preferably propylene or butene, most preferably propylene. The diene is preferably a non-conjugated diene selected from the group consisting of 5-ethylidene-2-norbornene (ENB), 1,4-hexadiene, 1,6 octadiene, 5-methyl-1,4-hexadiene, 3,7-dimethyl-1,6-octadiene, dicyclopentadiene (DCPD), norbornadiene, 5-vinyl-2-norbornene (VNB), and combinations thereof, most preferably ENB.

In a preferred embodiment, the maximum amount of ethylene derived units is 90 mole percent (corresponding to 85 wt % in EPDM), more preferably 80 mole percent and most preferably 75 mole percent based on the total moles of monomer. The preferred minimum amount of ethylene derived units is 35 mole percent, more preferably 40 mole percent, even more preferably 50 mole percent based on the total moles of monomer. The diene content maximum is preferably 5.0 mole percent (15 wt %), more preferably 3.0 mole percent even more preferably 2.5 mole percent, with the preferred minimum being 0.2 mole percent (0.7 wt %), more preferably 0.3 mole percent, and even more preferably 0.5 mole percent. The balance of the polymer units is preferably made up of alpha olefin. Ethylene content is determined by FTIR, ASTM D3900, and is not corrected for diene content. ENB content is determined by FTIR, ASTM D6047. Other dienes can be measured via 1H NMR. All ranges disclosed herein are inclusive unless otherwise noted.

One well known measure of resiliency is tan ($\delta$) which denotes the ratio of the loss modulus G", to the elastic modulus G'. This quantifies the ability of a material to dissipate mechanical energy into heat versus the purely elastic storage of mechanical motion during one cycle of oscillatory movement. The measurement of tan ($\delta$) can be made by a dynamic analyzer, and may be made by a sweep of frequencies at a fixed temperature, then repeating that sweep of frequencies at several other temperatures, followed by the development of a master curve of tan ($\delta$) versus frequency by curve alignment. An alternate method is to measure tan ($\delta$) at constant frequency and strain over a temperature range. As used herein tan ($\delta$) is measured at 10.4 rad/sec and 13.95 % strain using A Rubber Processing Analyzer RPA 2000 (by Alpha Technologies Co).

Tan ($\delta$) may be lowered by raising the polymer molecular weight and/or by introducing long chain branching. However, processability suffers at high molecular weight, and long chain branching degrades tear properties. Thus preferred polymers have a molecular weight which allows for easy processing with little or no oil additive, and they have little or no long chain branching as described more fully below.

The polymers of this invention preferably have a tan ($\delta$) of 0.5 or less, preferably 0.45 or less, most preferably from 0.1 to 0.4 when measured at 125° C. at a frequency of 10.4 rad/sec and a strain of 13.95%.

In a preferred embodiment, the polymer compositions of this invention have an overall Mooney viscosity of at least 30, more preferably at least 50, even more preferably at least 60, with preferred maximum Mooney viscosity being 150, and even more preferably 100.

As used herein Mooney viscosity is measured as ML (1+4) at 125° C. in Mooney units according to ASTM D-1646. However, Mooney viscosity values greater than about 100 cannot generally be measured under these conditions. In this event, a higher temperature can be used (i.e., 150° C.), with eventual longer shearing time (i.e., 1+8@125 or 150° C.), but more preferably, the Mooney measurement is carried out using a non-standard small rotor as described below.

The non-standard rotor design is employed with a change in Mooney scale that allows the same instrumentation on the Mooney machine to be used with higher Mooney polymers. This rotor is termed MST—Mooney Small Thin. One MST point is approximately 5 ML points when MST is measured at (5+4@200° C.) and ML is measured at (1+4@125° C.).

ASTM D1646-99 prescribes the dimensions of the rotor to be used within the cavity of the Mooney machine. This prescription allows a large and a small rotor differing only in diameter. These are referred to as ML (Mooney Large) and MS (Mooney Small). However, EPDM can be produced at such high MW that the torque limit of the Mooney machine can be exceeded using these standard prescribed rotors. In these instances, the test is run using the MST rotor that is both smaller in diameter and thinner. Typically when the MST rotor is employed, the test is also run at different time and temperature. The pre-heat time is changed from the standard 1 minute to 5 minutes and the test is run at 200° C. instead of the standard 125° C. Thus, the value will be reported as MST (5+4), 200° C. Note that the run time of 4 minutes at the end of which the Mooney reading is taken remains the same as the standard conditions. For the purposes of an approximate conversion between the two scales of measurement, multiply the MST (5+4) 200° C. Mooney value by 5 to obtain the ML(1+4) 125° C. equivalent. The MST rotor should be prepared as follows:

1. The rotor should have a diameter of 30.48+/−0.03 mm and a thickness of 2.8+/−0.03 mm (tops of serrations) and a shaft of 11 mm or less in diameter.
2. The rotor should have a serrated face and edge, with square grooves of 0.8 mm width and depth of 0.25–0.38 mm cut on 1.6 mm centers. The serrations will consist of two sets of grooves at right angles to each other (form a square crosshatch).
3. The rotor shall be positioned in the center of the die cavity such that the centerline of the rotor disk coincides with the centerline of the die cavity to within a tolerance of +/−0.25 mm. A spacer or a shim may be used to raise the shaft to the midpoint.
4. The wear point (cone shaped protuberance located at the center of the top face of the rotor) shall be machined off flat with the face of the rotor.

For blends of polymers, the Mooney viscosity is obtained using the relationship shown in Equation 1 below.

$$\text{Log } ML = n_A \log ML_A + n_B \log ML_B \quad \text{(Equation 1)}$$

Where all logarithms are to the base 10. ML is the Mooney viscosity of a blend of two polymers A and B each having individual Mooney viscosities $ML_A$ and $ML_B$, respectively. The fraction of polymer A in the blend is $n_A$, while the fraction of the polymer B is $n_B$. In the present application, Equation (1) has been used to generate blends of high Mooney polymer (A) with a low Mooney polymer (B) that have measurable Mooney viscosities under (1+4@125° C.) conditions. Knowing ML, $ML_A$ and $n_A$, $ML_B$ can be easily calculated. For high Mooney polymers, $ML_A$ is conveniently measured using the MST rotor as described above. In this work, we have found the following correlation: ML (1+4@125° C.)=5.13*MST (5+4@200° C.).

The polymer compositions of this invention may not require additives to facilitate easy processing. Consequently, in a preferred embodiment, the polymer is substantially free of highly branched material (such as is described in U.S. Pat. No. 6,268,427) and/or oil additives such as extender oils. Extender oils, typically naphthenic or paraffinic oils, are often added to EPDM polymers by adding the oil to the polymer solution exiting the polymerization reactors and recovering the oil extended polymer, or by adding the oil in a later compounding stage. The amount of oil used is usually from about 10 to about 150 parts by weight of oil per 100 parts by weight of polymer.

The polymers of this invention are preferably essentially free of oil additive, i.e., do not contain added oil or contain less than 30, more preferably less than 20, and even more preferably less than 10 parts by weight of oil per 100 parts by weight of polymer. Oil content is measured by extraction of a small elastomer sample pressed in film using methyl-ethyl ketone in a Soxhlet extraction unit. In order to extract oil from a larger sample, the sample is fully dissolved in a suitable solvent (i.e., two to three weight percent solution in toluene containing some antioxidant), then precipitated in acetone, filtered and dried. Oil is used herein to mean a naphthenic or paraffinic compound that is liquid at 25° C.

Likewise, the polymers of this invention are preferably not highly ranched, therefore, the branching index is at least 0.7, more preferably at east 0.8, even more preferably at least 0.9, and most preferably 1.0.

The relative degree of branching in ethylene, alpha-olefin, diene monomer elastomeric polymers is determined using a branching index factor (BI). Calculating this factor requires a series of three laboratory measurements of polymer properties in solutions as disclosed in VerStrate, Gary, "Ethylene-Propylene Elastomers", Encyclopedia of Polymer science and Engineering, 6, $2^{nd}$ edition (1986). These are: (i) $M_{w, GPC\ LALLS}$, weight average molecular weight measured using a low angle laser light scattering (LALLS) technique in combination with Gel Permeation Chromatography (GPC) (ii) weight average molecular weight ($M_{w, DRI}$) and viscosity average molecular weight ($M_{v, DRI}$) using a differential refractive index (DRI) detector in combination with GPC and (iii) intrinsic viscosity (IV) measured in decalin at 135° C. The first two measurements (i and ii) are obtained in a GPC using a filtered dilute solution of the polymer in trichlorobenzene.

An average branching index (i.e., branching index as used herein) is defined as:

$$BI = \frac{M_{v,br} \times M_{w,DRI}}{M_{w,GPC\ LALLS} \times M_{v\ GPC\ DRI}}$$

where, $M_{v,br}=(IV/k)^{1/a}$; and 'a' is the Mark-Houwink constant (=0.759 for ethylene, propylene diene elastomeric polymers in decalin at 135° C.). From equation (1) it follows that the branching index for a linear polymer is 1.0. For branched polymers, the extent of branching is defined relative to the linear polymer. Since at a constant number average molecular weight $M_n$, $(M_w)_{branch} > (M_w)_{linear}$, BI for branched polymers is less than 1.0, and a smaller BI value denotes a higher level of branching. In place of measuring IV in decalin, it is also acceptable to measure IV using a viscosity detector in tandem with DRI and LALLS detectors in the so-called GPC-3D instrument. In this case, 'k' and 'a' values appropriate for the GPC solvent should be used in the equation above. The polymers of this invention are multi-modal meaning that they contain at least two fractions. The multimodality manifests itself as two distinct peaks or a main peak and a shoulder peak in the $M_{w\ GPC\ LALLS}$ signal. This multimodality is caused by the blending of a very high with a very low molecular weight component either as a result of sequential polymerization as described below, or by physical blending techniques well known in the art. One polymer fraction, the "first fraction," preferably has a Mooney viscosity of over 120 (determined in practice using a MST rotor as described earlier), preferably at least 175, and even more preferably at least 200. Generally, the maximum Mooney viscosity will be determined by the desired polydispersity of the blend and the amount of each fraction in the blend. Another polymer fraction, the "second fraction," has a Mooney viscosity of 120 or less, preferably below 75, and most preferably below 50. The lower Mooney viscosity fraction has a number average molecular weight (Mn) at least 3500, or at least 25000, and preferably a viscosity average molecular weight (Mv) of at least 9000.

Both fractions in the blend by themselves preferably have a molecular weight distribution of 4 or less, preferably 3 or less, more preferably 2.5 or less, and most preferably 2 or less. However, the molecular weight distribution of the resulting blend is generally large (greater than 3) when made to yield the highly elastic (low tan delta) compositions of this invention. As used herein, molecular weight distribution Mw/Mn is determined according to well known methods, for example by GPC (Gel Permeation Chromatography) on a Waters 150 gel permeation chromatograph equipped with a differential refractive index (DRI) detector and a Chromatix KMX-6 on line light scattering photometer. The system is used at 135° C. with 1,2,4-trichlorobenzene as the mobile phase using Shodex (Showa Denko America, Inc) polystyrene gel columns 802, 803, 804 and 805. This technique is discussed in "Liquid Chromatography of Polymers and Related Materials III", J. Cazes editor, Marcel Dekker. 1981, p. 207, which is incorporated herein by reference. No corrections for column spreading are employed; however, data on generally accepted standards, e.g. National Bureau of Standards Polyethylene 1484 and anionically produced hydrogenated polyisoprenes (an alternating ethylene-propylene copolymers) demonstrate that such corrections on Mw/Mn (=MWD) are less than 0.05 units. Mw/Mn is calculated from elution times. The numerical analyses are performed using the commercially available Beckman/CIS customized LALLS software in conjunction with the standard Gel Permeation package. Calculations involved in the characterization of polymers by $^{13}$CNMR follow the work of F. A. Bovey in "Polymer Conformation and Configuration" Academic Press, New York, 1969. Reference to Mw/Mn implies that the Mw is the value reported using the LALLS detector and Mn is the value reported using the DRI detector described above.

In a preferred embodiment, the first fraction comprises less than 78 wt %, preferably less than 72 wt %, and especially less than 65 wt % of ethylene derived units based on the total weight of ethylene and alpha-olefin.

In a preferred embodiment, the first and second fractions have a diene content less than 15 wt %, preferably less than 12 wt %, and especially less than 10 wt %, based on the total weight of ethylene, alpha-olefin, and diene.

In a preferred embodiment, the weight percent (based on total polymer weight) of ethylene in the first fraction and the weight percent of ethylene in the second fraction differ by no more than 20%, even more preferably by no more than 10%. The relative amount of each fraction can vary and will depend on the desired overall polymer polydispersity and resiliency. Also, in a preferred embodiment, both fractions preferably contain the same or similar weight percent of diene, i.e., the weight percent in each fraction differs by no more than 8 weight percent, preferably by no more than 3 weight percent, more preferably by no more than 2 weight percent, and most preferably by no more than 1 weight percent.

In a preferred embodiment, the overall polymer will comprise at least 50 weight percent of the first fraction (high Mooney viscosity) based on the total polymer weight and from 5 to 50 weight percent of the second fraction (low Mooney viscosity). More preferably the overall polymer will comprise at least 60, even more preferably at least 65 and still more preferably at least 70 weight percent based on the total polymer weight of the first fraction (high Mooney viscosity), and from 5 to 40 weight percent of the second fraction (low Mooney viscosity), even more preferably from 5 to 35, and still more preferably from 5 to 30 weight percent of the second fraction.

Any number and type of additives may be compounded with the polymer compositions of this invention including but not limited to: carbon black, plasticizer like paraffinic oil, process aids such as fatty acids, waxes etc., antioxidants, curatives, fillers such as calcium carbonate, clay, silica and the like, antiozonants, tackifiers, and scorch inhibiting agents.

These polymer compositions may be cured or vulcanized according to known methods, for example using agents such as sulfur or peroxide as is described in "Vulcanization", Chapter 7 of "Science and Technology of Rubber", by A. Y. Coran, (F. R. Eirich editor) Academic Press Inc., 1978.

The polymers of this invention can be used in a wide variety of applications where increased processability needs to be balanced with resilience and aging. A few automotive (car, truck, aircraft, tractor etc.) examples include: engine mounts, transmission mounts, chassis/suspension insulators, exhaust mounts, drive shaft dampers, strut mounts, crankshaft pulleys, leafspring dampers, radiator mounts, front and rear bumper mountings, steering wheel mounts, seating, bushings, A/C clutch assembly and hydromounts. Vibration damping devices are also used in household electrical appliances such as air-conditioners, laundry machines, refrigerators, electric fans, vacuums, dryers, etc. Audio equipment employs vibration damping devices, and such devices are common throughout manufacturing processes.

Generally speaking, any process may be used to prepare the polymers of this invention. The fractions can be obtained using series reactors as described below or by using parallel reactors or by mechanical blending though the former method is preferred.

When produced by direct polymerization, the catalyst used is preferably a single-site catalyst, generally with an activity and longevity sufficient to polymerize in a homogeneous environment at temperatures of at least 100° C. so that the different molecular weight fractions can be produced in successive reactors arranged in series by temperature and/or hydrogen control.

More preferably, the catalyst is a bulky ligand transition metal catalyst. The bulky ligand contains a multiplicity of bonded atoms, preferably carbon atoms, forming a group, which may be cyclic with one or more optional heteroatoms. The bulky ligand may be a cyclopentadienyl derivative, which can be mono- or poly-nuclear. One or more bulky ligands may be bonded to the transition metal atom. The bulky ligand is assumed, according to prevailing scientific theory, to remain in position in the course of polymerization to provide a homogenous polymerization effect. Other ligands may be bonded or coordinated to the transition metal, preferably detachable by a cocatalyst or activator, such as a hydrocarbyl or halogen-leaving group. It is assumed that detachment of any such ligand leads to the creation of a coordination site at which the olefin monomer can be inserted into the polymer chain. The transition metal atom is a Group IV, V or VI transition metal of the Periodic Table of Elements. The transition metal atom is preferably a Group IVB atom. While it is assumed that the transition metal in the active catalyst state is in the 4+ oxidation state and a positively charged cation, precursor transition metal complexes that are generally neutral may be in a lower oxidation state. Reference is made to U.S. Pat. No. 6,211,312 for a more detailed description of suitable metallocene complexes.

The catalyst is derivable from a compound represented by the formula:

$$[L]_m M[X]_n$$

wherein L is the bulky ligand; X is the leaving group, M is the transition metal and m and n are such that the total ligand valency corresponds to the transition metal valency. Preferably the catalyst is four co-ordinate such that the compound is ionizable to a 1+ valency state. The ligands L and X may be bridged to each other, and if two ligands L and/or X are present, they may be bridged. The metallocenes may be full-sandwich compounds having two ligands L which are cyclopentadienyl groups or half-sandwich compounds having one ligand L only which is a cyclopentadienyl group.

The term "metallocene" is herein defined to contain one or more cyclopentadienyl moieties in combination with a transition metal of the Periodic Table of Elements. The metallocene catalyst component is represented by the general formula (Cp)mMRnR'p wherein Cp is a substituted or unsubstituted cyclopentadienyl ring; M is a Group IV, V or VI transition metal; R and R' are independently selected halogen, hydrocarbyl group, or hydrocarboxyl groups having 1–20 carbon atoms; m=I-3, n=O-3, p=O-3, and the sum of m+n+p equals the oxidation state of M.

More preferred are metallocenes which are biscyclopentadienyl derivatives of a Group IV transition metal, preferably zirconium or hafnium.

See ExxonMobil WO 99/41294. These may be derivatives containing a fluorenyl ligand and a cyclopentadienyl ligand connected by a single carbon and silicon atom. (See ExxonMobil WO99/45040; and WO99/45041) Most preferably the Cp ring is unsubstituted and/or the bridge contains alkyl substituents such as alkylsilyl substituents to assist in the alkane solubility of the metallocene. See WO0024792 and WO0024793 (fully incorporated herein by reference). Other metallocene catalyst systems may show a polymerization capability suitable for making the composition according to the invention. For example, Dow EP418044 uses a monocyclopentadienyl compound similar that that EP416815. Similar compounds are described in ExxonMobil EP-420436. Sumitomo WO9703992 shows a catalyst in which a single Cp species and a phenol are linked by a C or Si linkage, such as Me2C(Cp)(3-tBu-5-Me-2-phenoxy)TiCI2. Nova WO200105849 discloses Cp-phosphinimine catalysts, such as (Cp)((tBu)3P=N-)TiCI2.

The catalyst is generally used with a cocatalyst or activator which, it is assumed according to prevailing theory, helps form the metallocene cation. Aluminum alkyl derived activators may be used of which methyl alumoxane is the prime and well know example. This material may also function as scavenger is commercially obtainable from Albemarle or Schering.

Non or weakly coordinating anion (NCA) generating activators of the type described in ExxonMobil EP277004 are preferred. These activators are often used and described in conjunction with the metallocene in the above metallocene patent references. NCA's may be generated from precursors which may be a neutral salt containing the stabilizing anion or a nonionic Lewis Base capable of abstracting a group from the transition metal complex to form an stabilizing anion. The NCA may, depending on mode of generation, have three or four ligands substituted on a metal atom such as boron or aluminum. The ligands are preferably fluorinated, more preferably perfluorinated, aromatic moieties such as phenyl bisphenyl or naphthyl. Reference is also made to ExxonMobil WO01/42249 which describes another suitable NCA structure (fully incorporated herein by reference).

In operation on a commercial scale, the high catalyst activity and low catalyst concentration lead to increased sensitivity to poisons. Poisons may enter into the polymerization reactor as impurities in the solvent or monomer feed or be generated by secondary processes such as the catalyst killing operation, generally performed with water after polymerization proper is completed.

Such poisons may be deactivated by using an alkyl aluminum scavenger such as TEAL, TIBAL or n-octyl aluminum. The presence of poison can also be countered by providing a molecular sieve or other purifying installation as part of the recycle in the continuous reactor lay out.

Conditions as between the first and the second reactor may be differentiated as described in WO99/45047. Generally a terpolymer (containing a suitable diene) is made using ethylene, higher alpha-olefin (e.g. propylene, butylene, hexene, and octene) and non-conjugated diene in a process which comprises: a) feeding a first set of monomers containing a diene to a first reactor, b) adding a single site catalyst to the first reactor, c) operating the first reactor to polymerize the first set of monomers to produce an effluent containing a first polymer component and optionally unreacted monomers, d) feeding the effluent of c) to a second reactor, e) feeding a second set of monomers to the second reactor, f) operating the second reactor to polymerize the second set of monomers and any unreacted monomers to produce a second polymer component. Optionally, additional catalyst may also be fed to the second rector. The final polymer product comprises the mixture of said first and second polymer components.

After polymerization and any catalyst deactivation or killing, the solvent can be removed by one or more flashing steps or a liquid phase separation as described in Mitsui EP552945 so that the solvent content is lowered to less than 0.1 wt % or less. The solvent can be recycled and the polymer baled or pelletized.

Embodiments of the present invention include economically produced synthetic materials that can have one or more of the following advantages over previously known materials: improved balance of processability, resilience, and durability and reduced or eliminated need for extender oil.

EXAMPLES

To demonstrate the benefits of the present invention, a series of polymers were prepared using two reactors connected in series. The higher Mooney viscosity polymer fraction was made in the first reactor while the lower Mooney viscosity polymer fraction was made in the second reactor.

Examples 1–8 Polymerization Procedure

Polymerizations were carried out in a series of two twenty-eight liter stirred reactors with continuous flow of feeds to the system and continuous withdrawal of products. All feeds were pumped into the reactors by metering pumps except for the ethylene, which flowed as a gas under its own pressure through a mass flow meter/controller. The hexane solvent and monomers were purified over beds of alumina and molecular sieves. Reactor temperature was controlled by controlling the chilling of the feed. The reactors were operated liquid full at a pressure of about 2000 kPa.

Ethylene, propylene and ENB feeds were combined into one stream with hexane along with a hexane solution of triisobutyl aluminum scavenger to reduce the level of catalyst poisons. The catalyst (BIS(METHYL) (CYCLOPENTADI ENYL)(DI(4-TRI ETHYLSILYL-PHENYL)(METHYL)-9-(2,7-DI-TERT-BUTYL-FLUORENYL)HAFNIUM) and activator (N,N-Dimethyl anilinium (tetrakis pentafluorophenyl borate) were premixed in toluene and pumped, separately from the monomer fed, to the reactor. In some of the examples an alternate catalyst-Diphenylmethylene (cylopentadienyl)(fluorenyl) hafnium dimethyl was used. The product from the reactor exited through a pressure control valve and was collected for polymer recovery. The polymer product was recovered from solution at the completion of the polymerization by either steam stripping followed by mill drying or by devolatilizing extrusion and under water pelletization.

The range of reactor conditions exemplified in this invention is shown in Table 1. Molecular weight (Mooney viscosity) of the first and second fraction shown in Table 1 was controlled by adjusting the hydrogen feed to each of the reactors. The amount of the respective polymer fraction 1 and 2 shown in Table 1 was controlled by varying the monomer feed rates to each of the reactors as well as the catalyst feed rates. The composition of each of the components was controlled by the ratio of monomers in the feed to each of the reactors.

Knowing the fraction of polymer made in reactor 1, its Mooney viscosity and the Mooney viscosity of the final product, the Mooney viscosity of the fraction of polymer actually made in reactor 2 has been calculated using equation (1).

Figure 1:
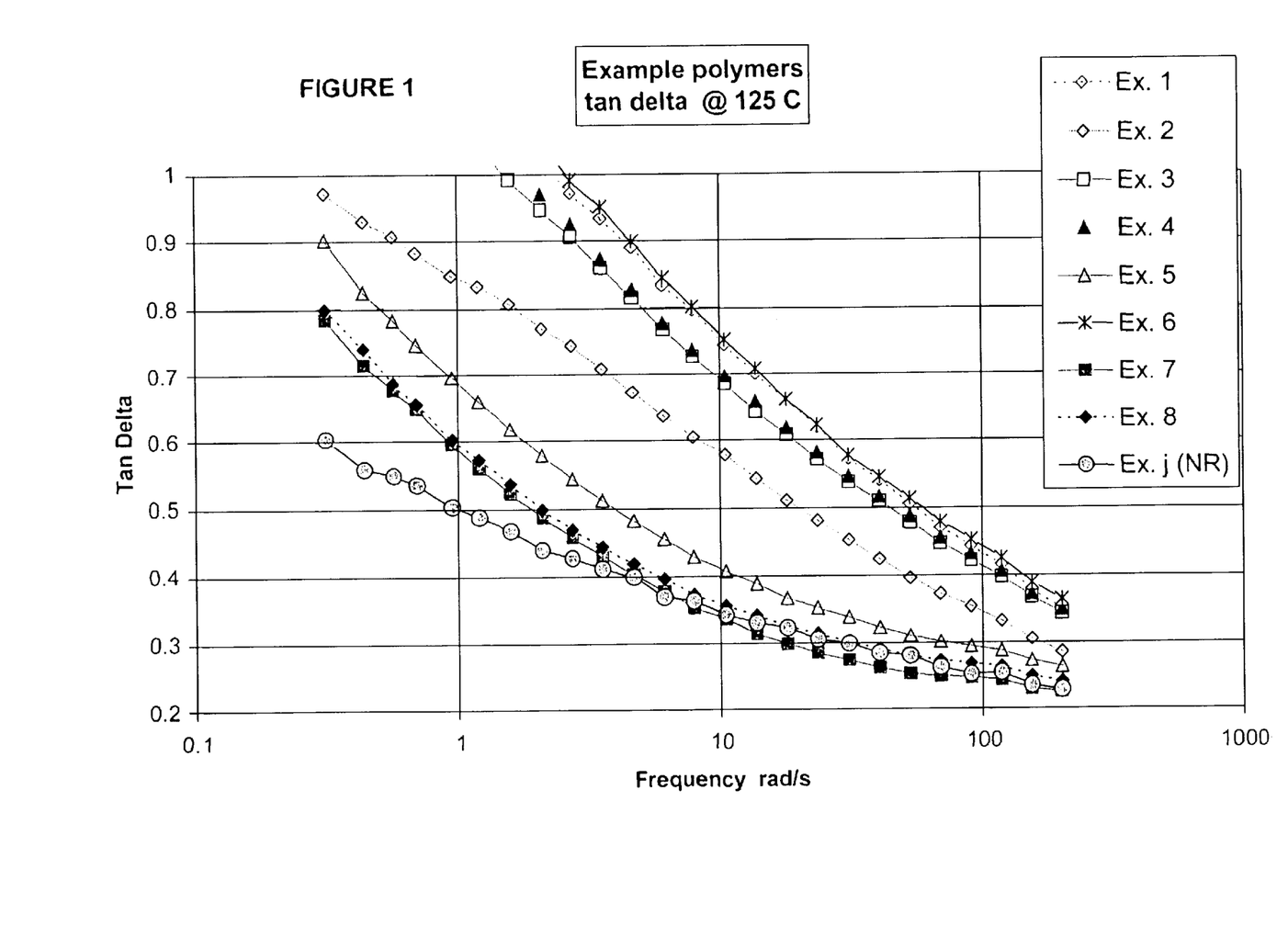
FIGS. 1, 2 and 3 are graphs of the tan delta versus frequency of several comparative and inventive compositions.

The elasticities of the polymers of the Examples 1–8 are compared to natural rubber on FIG. 1, which depicts the evolution of the polymers tan delta versus frequency at 125° C. and 13.95% strain measured on the RPA 2000. On FIG. 1, two families of polymers can be identified: one that has high tan delta and another that has a low tan delta. These two families can be clearly distinguished from each other using a single tan delta value measured at 10.4 rad/s. Those polymers having a tan delta below 0.5 at 10.4 rad/s frequency exhibit clearly a higher elasticity than the others between 5 and 200 rad/s frequency and have a rheology much closer to natural rubber.

Examples 1 and 2 show that the polymer elasticity is lower and a tan delta below 0.5 is not achieved when the amount of fraction 1 is only 29%, even if the Mooney of fraction 1 is greater than 120. Examples 3, 4 and 6 show that the polymer elasticity is also lower and a tan delta below 0.5 is not achieved when the Mooney of fraction 1 is less than 120, even if the amount of this fraction is greater than 50%. Examples 5,7 and 8 have a much higher elasticity resulting in a tan delta below 0.5 because the amount of fraction 1 is greater than 50% and the Mooney of fraction 1 is greater than 120.

Comparative Examples a to i

The polymers of this invention were compared to commercially available EPDM elastomers of high Mooney viscosity. Table 2 summarizes the characteristics of these EPDM polymers. For oil extended polymers, the Mooney viscosity of the dry polymer has been estimated using the following equation (2):

$$ML_{OE}=ML_{Pol}\times[100/(100+phr\ oil)]^{2.8} \qquad \text{(equation 2)}.$$

where $ML_{OE}$ is the Mooney viscosity of the oil extended polymer, and $ML_{Pol}$ is the Mooney viscosity of the polymer without the oil, and phr oil is the amount of oil in parts per hundred of rubber which is in the elastomer.

Examples a) and b) (Buna™ AP 641 and Buna™ EPT 9650 available from Bayer AG) are unimodal EPDM polymers of high Mooney viscosity, but their elasticity is low as indicated by a tan δ well above 0.5

Example c) (Keltan™ 4903 available from DSM Elastomers) is a unimodal high Mooney viscosity EPDM having a tan δ just above 0.5.

Example d) (Keltan™ 820) is a fairly branched EPDM polymer (containing DCPD as diene) of high Mooney viscosity and having a tan δ just above 0.5.

Example e) (Vistalon™ V3666 available from ExxonMobil Chemical) is a unimodal EPDM of very high molecular weight extended with 75 phr of oil to render it processible, and having a tan δ of 0.49.

Example e') is the same polymer whose oil has been extracted. This polymer has a MST (5+4@200° C.) of 51 and thus a calculated Mooney viscosity (1+4@125° C.) of about 260. Without the extending oil, its tan delta is 0.34.

Example f) (Keltan™ 8340A) is a unimodal controlled-branched EPDM of high Mooney viscosity, but having a tan δ well above 0.5.

Example g) (Keltan™ 7341A) is a high Mooney viscosity controlled-branched EPDM polymer extended with 20 phr of oil. Its GPC LALLS trace exhibits a minor shoulder in the higher MW range. As such, this polymer has a tan 6 of 0.49. After extraction of the oil (Example g'), the tan δ of the polymer decreases to 0.46 for a calculated Mooney viscosity of about 135.

Example h) (Vistalon™ V7500) is a bimodal high Mooney viscosity EPDM, consisting of a major fraction of lower MW polymer with a minor fraction of higher MW polymer. It has a tan 6 of 0.5.

Example i) is a bimodal EPDM of similar structure as example h) and containing 15 phr of oil. As such it has a tan 6 of 0.49. After extraction of the oil (example i'), the tan δ decreases to 0.47 for a calculated Mooney viscosity of about 110.

Figure 2:
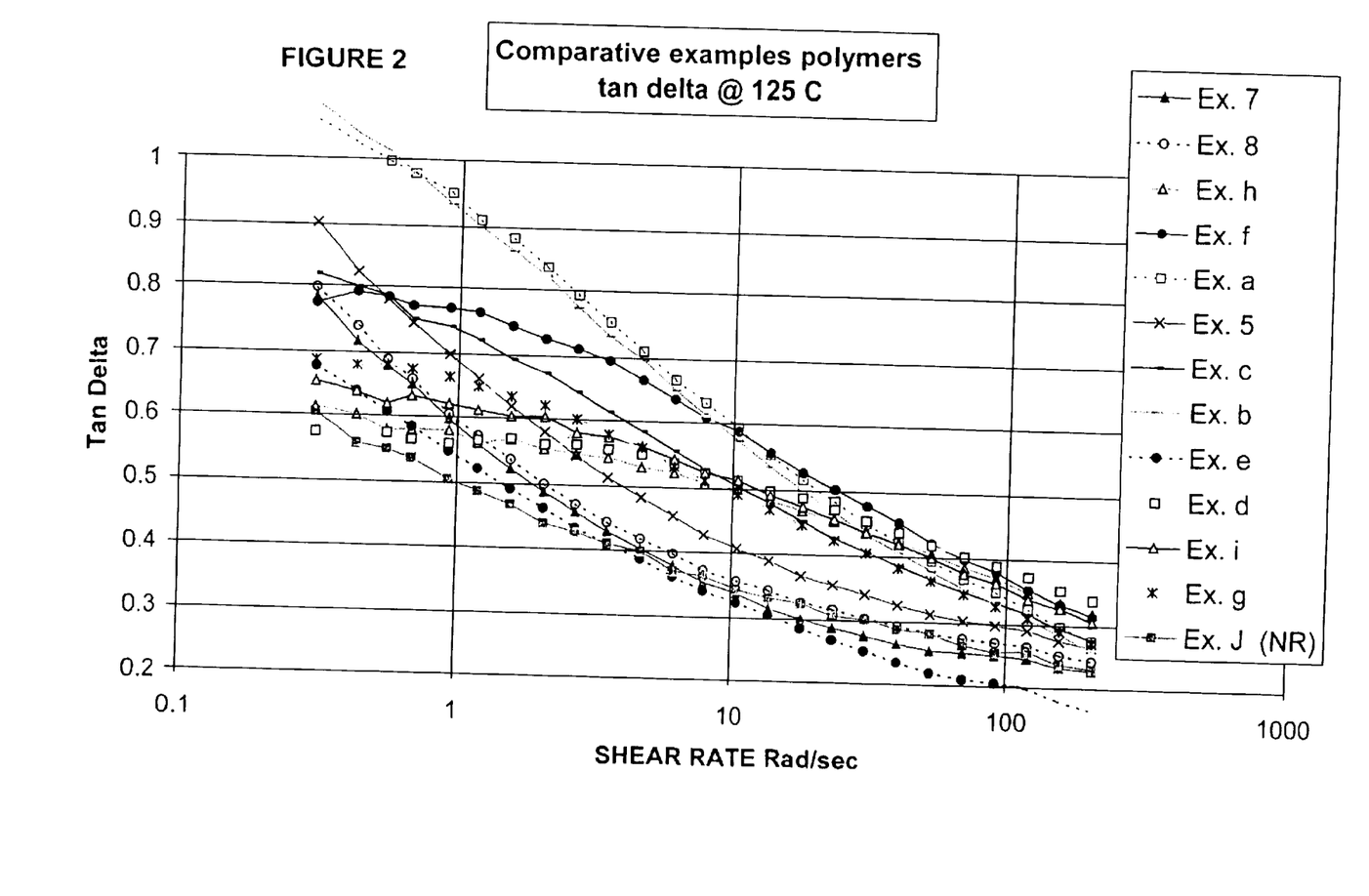

As shown on FIG. 2, it is obvious that none of these polymers in their commercial form approaches the low tan delta of natural rubber, while the polymers of the present invention allow reaching low tan δ values, even well below 0.5, by combining at least 50 weight percent of a high Mooney viscosity polymer with 5 to 50 weight percent of a low Mooney viscosity polymer component, whilst still being processible without the addition of extending oil. Only a very high molecular weight commercial EPDM extracted from its extending oil (comparative Example e') reaches a rheology comparable to the polymers of the present invention but its very high Mooney viscosity without the extender oil renders it totally unprocessable. Furthermore, none of the comparative example polymers consist of a major fraction of high Mooney polymer with a minor fraction of lower Mooney polymer.

To illustrate the suitability of the polymers of the present invention in resilient applications, one of them has been compounded and evaluated against natural rubber and against a high Mooney/low tan delta commercially available EPDM polymer.

TABLE 1

| | units | Ex-1 | Ex-2 | Ex-3 | Ex-4 | Ex-5 | Ex-6 | Ex-7 | Ex-8 |
|---|---|---|---|---|---|---|---|---|---|
| Process Data | | | | | | | | | |
| Reactor 1 Temperature | °C. | 56 | 38 | 93 | 95 | 50 | 84 | 60 | 60 |
| Reactor 2 Temperature | °C. | 85 | 78 | 103 | 102 | 70 | 87 | 69 | 70 |
| Production Rate | kg/hr | 5.5 | 6.3 | 8.2 | 8.3 | 6.16 | 5.8 | 5.59 | 5.77 |
| Solvent Rate - Reactor 1 | kg/hr | 45 | 50 | 60 | 60 | 65 | 55 | 65 | 65 |
| Solvent Rate - Reactor 2 | kg/hr | 45 | 40 | 30 | 30 | 25 | 35 | 25 | 25 |
| Ethylene Rate - Reactor 1 | kg/hr | 1.2 | 0.83 | 2.79 | 3.05 | 2.75 | 2.83 | 1.79 | 1.79 |
| Ethylene Rate - Reactor 2 | kg/hr | 2.6 | 1.92 | 1.71 | 1.46 | 1.1 | 0.95 | 0.39 | 0.5 |
| Propylene Rate - Reactor 1 | kg/hr | 0.56 | 1.4 | 3.38 | 3.8 | 1.28 | 1.34 | 3.08 | 3.08 |
| Propylene Rate - Reactor 2 | kg/hr | 1.14 | 2.75 | 1.22 | 1.3 | 0.52 | 0.35 | 0.61 | 0.8 |
| ENB Rate - Reactor 1 | kg/hr | 0.11 | 0.15 | 0.93 | 0.93 | 0.254 | 0.32 | 0.37 | 0.37 |
| ENB Rate - Reactor 2 | kg/hr | 0.15 | 0.25 | 0.39 | 0.41 | 0.1 | 0 | 0.038 | 0.05 |
| Hydrogen Rate - Reactor 1 | g/h | 0.078 | 0.000 | 0.000 | 0.000 | 0.275 | 0.074 | 0.000 | 0.000 |
| Hydrogen Rate - Reactor 2 | g/h | 0.468 | 0.580 | 1.021 | 0.572 | 0.743 | 0.385 | 1.007 | 1.007 |
| Catalyst Rate - Reactor 1 | g/h | 0.073 | 0.117 | 0.289 | 0.236 | 0.098 | 0.203 | 0.098 | 0.098 |
| Catalyst Rate - Reactor 2 | g/h | 0.000 | 0.000 | 0.142 | 0.141 | 0.000 | 0.087 | 0.000 | 0.000 |
| Residence Time - Reactor 1 | min | 18 | 16 | 14 | 14 | 13 | 15 | 13 | 13 |
| Residence Time - Reactor 2 | min | 9 | 9 | 9 | 9 | 9 | 9 | 9 | 9 |
| Product Data | | | | | | | | | |
| Fraction 1 Ethylene (1) | wt % | 71.4 | 43.8 | 55.1 | 55.3 | 71 | 69.2 | 43.6 | 44 |
| Fraction 2 Ethylene (1) | wt % | 71.0 | 48.4 | 59.2 | 54.8 | 72.5 | 72.4 | 44.0 | 43.7 |
| Product Ethylene | wt % | 71.1 | 47.1 | 56.8 | 55.1 | 71.5 | 70.2 | 43.7 | 43.9 |
| Fraction 1 ENB | wt % | 5.18 | 4.2 | 9 | 8.3 | 4.5 | 5.1 | 5.1 | 5.2 |
| Fraction 2 ENB | wt % | 4.8 | 5.6 | 10.0 | 9.6 | 7.7 | 4.8 | 7.3 | 6.9 |
| Product ENB | wt % | 4.9 | 5.2 | 9.4 | 8.8 | 5.6 | 5 | 5.7 | 5.7 |
| Fraction 1 MST (2) | | 42 | 72.4 | 16.7 | 17 | 51.7 | 18.5 | 35.5 | 45.7 |
| Fraction 1 ML (3) | | 215 | 371 | 86 | 87 | 265 | 95 | 182 | 234 |
| Fraction 2 ML (4) | | 38 | 42 | 38 | 33 | 22 | 23 | 21 | 13 |
| Product ML (3) | | 65.7 | 84.6 | 59.3 | 54.6 | 111 | 59.2 | 95 | 98.1 |
| Amount Fraction 1 | % | 29 | 29 | 59 | 60 | 66 | 69 | 73 | 70 |
| Tan delta (5) | | 0.75 | 0.58 | 0.69 | 0.70 | 0.41 | 0.75 | 0.34 | 0.35 |

(1) Fraction 1 is the polymer fraction made in the first reactor, Fraction 2 is the polymer fraction made in the second reactor.
(2) MST (5 + 4 @ 200° C.)
(3) ML (1 + 4 @ 125° C.), ML = 5.13*MST
(4) Mooney viscosity is calculated from equation (1)
(5) RPA 125 C, 13.95% strain, 10.4 rad/s

TABLE 2

Examples 9 to 13

| Compar. Example | Commercial name | | Ethylene wt % | Diene (6) wt % | ML (1 + 4 @ 125 C) | Tan delta (8) @ 10.4 rad/s |
|---|---|---|---|---|---|---|
| a | Buna ™ | AP 641 | 53.5 | 5.5 | 88 | 0.59 |
| b | Buna ™ | EPT 9650 | 57.5 | 6.5 | 91 | 0.57 |
| c | Keltan ™ | K4903 | 54.5 | 9 | 88 | 0.51 |
| d | Keltan ™ | 820 | 62 | 5 (7) | 77 | 0.51 |
| e | Vistalon ™ | V3666 (1) | 64 | 4.5 | 52 | 0.49 |
| e' | Vistalon ™ | V 3666 (2) | 64 | 4.5 | 260 | 0.34 |
| f | Keltan ™ | 8340A | 55.5 | 5.7 | 80 | 0.59 |
| g | Keltan ™ | 7341A (3) | 56 | 7.5 | 80 | 0.49 |
| g' | Keltan ™ | 7341A (2) | 56 | 7.5 | 135 | 0.46 |
| h | Vistalon ™ | V7500 | 55.5 | 5.7 | 91 | 0.50 |
| i | Vistalon ™ | 8800 (4) | 53.5 | 10 | 73 | 0.51 |
| i' | Vistalon ™ | 8800 (2) | 53.5 | 10 | 110 | 0.47 |
| j | Natural | Rubber | | | 60(5) | 0.34 |

(1) Polymer extended with 75 phr oil
(2) Polymer extracted from its extending oil
(3) Polymer extended with 20 phr oil
(4) Polymer extended with 15 phr oil
(5) Mooney measured at (1 + 4 @ 100°
(6) diene is ethylidene norbornene
(7) Diene is dicyclopentadiene
(8) tan delta measured at t 125° C. at 13.95% strain
The Natural Rubber is CV 50 from Standard Malaysian Rubber The polymer of Example 7 was compounded With carbon black and oil in an internal mixer according to the recipe shown in Table 3, which is representative of a vibration damping compound. Natural rubber (comparative Example j) and polymer of comparative Example h have been compounded in the same recipe.

Use of the terms parts per hundred parts rubber (phr) and the term parts per hundred elastomeric polymer, are considered equivalent for purposes of this application. Use of the term "compound" for purposes of this application includes the elastomeric polymer and optionally one or more of the following ingredients.

Carbon black used in the reinforcement of rubber is generally produced from the combustion of a gas and/or a hydrocarbon feed and having a particle size from 20 nm to 100 nm for the regular furnace or channel black or from 150 to 350 nm for the thermal black. Level in the compound may range from 10 to 300 parts per 100 parts of elastomeric polymer (phr).

Processing oil, preferably paraffinic, may be added to adjust both the viscosity of the compound for good processing and its hardness in the range of 50 to 85 Shore A. The amount in the compound may vary from 0 to 200 parts per hundred of elastomeric polymer (phr). Flexon™ 885 is the ExxonMobil trademark for a paraffinic rubber processing oil. Sundex™ is the Sun Oil trade mark for an aromatic type processing oil.

Zinc oxide and stearic acid may be added to activate the accelerators and attain a good crosslink density. Typical quantities are between 0 to 20 phr of Zinc oxide and 0 to 5 phr of stearic acid.

Protective agents may be added to the compound to improve its aging performance in adverse conditions like heat, ozone, light, Agerite™ resin D is a TriMethylhydroxyQuinoline from Vanderbilt R.T, Winstay™ 100 is a Phenylene DiAmine from Vanderbilt R. T.

Vulcanizing agents may be used to cause the chemical reaction resulting in crosslinking the elastomer molecular chains. Typical are sulfur (0 to 10 phr), sulfur donor like thiuram disulfides (TetraMethylThiuramDiSulfide) and thiomorpholines (DiThioDiMorpholine) in the range of 0 to 10 phr).

Accelerators may be used to reduce the vulcanization time by increasing the speed of the crosslinking reaction. They are typically thiazoles (MercaptoBenzoThiazol diSulfide), dithiocarbamates (ZincDiButylDithioCarbamate), and many other well known by the one skilled in the art of rubber compounding. All can be used in the range of 0 to 5 phr.

A rubber compounder or fabricator of damping parts will plasticize or masticate the elastomer while adding compounding materials such as reinforcing materials, diluting fillers, vulcanizing agents, accelerators, and other additives which would be well known to those of ordinary skilled in the art, to produce an elastomer compound for use in vibration damping parts. Generally, such plasticization, mastication, and/or compounding, or both, takes place in a roll mill or an internal kneader, such as a Banbury mixer or the like. After compounding, the materials are then fed to a device that can meter the compound (like an injection press) and force (screw, piston of a press) the compounded elastomer into molding cavities for shaping and curing. Curing can take place in heated mold cavity between 140 to 250° C. Once cured, the parts are released from the mold at the exact shape designed by the part fabricator.

TABLE 3

Formulations

| Polymer of example:<br>(Parts per hundred of rubber,phr) | Example 9<br>7<br>40 phr C.B. | Example 10<br>h<br>40 phr C.B | Example 11<br>7<br>60 phr C.B | Example 12<br>h<br>60 phr C.B | Example 13<br>J Natural Rubber |
|---|---|---|---|---|---|
| Polymer | 100 | 100 | 100 | 100 | 100 |
| Paraffinic oil Flexon 885 | 40 | 40 | 60 | 60 | — |
| Aromatic oil Sundex 8125 | — | — | — | — | 5 |
| Carbon Black N550 | 40 | 40 | 60 | 60 | — |
| Carbon Black N330 | — | — | — | — | 27 |
| ZnO | 5 | 5 | 5 | 5 | 5 |
| Antioxidant Agerite Resin D | 0.4 | 0.4 | 0.4 | 0.4 | 1 |
| Antiozonant Wingstay 100 | — | — | — | — | 1.5 |
| Stearic Acid | 1 | 1 | 1 | 1 | 2 |
| Sulfur | 1.2 | 1.2 | 1.2 | 1.2 | 1.2 |
| MBTS 75% | 1.3 | 1.3 | 1.3 | 1.3 | 1.3 |
| TMTDS 80% | 1 | 1 | 1 | 1 | 1 |
| ZDBDC 80% | 1 | 1 | 1 | 1 | 1 |
| DTDM 80% | 1 | 1 | 1 | 1 | 1 |

The compounds were tested according to the tests methods summarized in Table 4. Results of testing are summarized in Table 5.

TABLE 4

Compound Testing Methods

| Parameter | Units | Test |
|---|---|---|
| Mooney Viscosity (compound) | ML1 + 4, 100° C., MU | ASTM D 1646 |
| Mooney Scorch time | $Ts_{2,\ 5\ or\ 10}$, 125° C., minutes | ASTM D 1646 |
| Monsanto Oscillating Disk Rheometer (ODR) @ 180° C. ± 3°arc | | |
| ML | dN.m | ASTM D 2084 |
| MH | dN.m | |
| Ts2 | minute | |
| $T_{90}$ | minute | |
| Cure rate | dN.m/minute | |
| Physical Properties, press cured 10 minutes @ 180° C. | | |
| Hardness | Shore A | ISO 7619–1986 |
| 100% Modulus | MPa | ISO 37–1977 type |
| Tensile Strength | MPa | 2 |

TABLE 4-continued

Compound Testing Methods

| Parameter | Units | Test |
|---|---|---|
| Elongation at Break | % | ISO 37–1977 type 2 |
| | | ISO 37–1977 type 2 |
| Compression Set, press cured 8 min. @ 180° C. 22 hrs/70° C./ 25% deflection | % | ISO 815–1972(E) |
| Tear Resistance | kN/m | ASTM D 624 die C |

Figure 3:
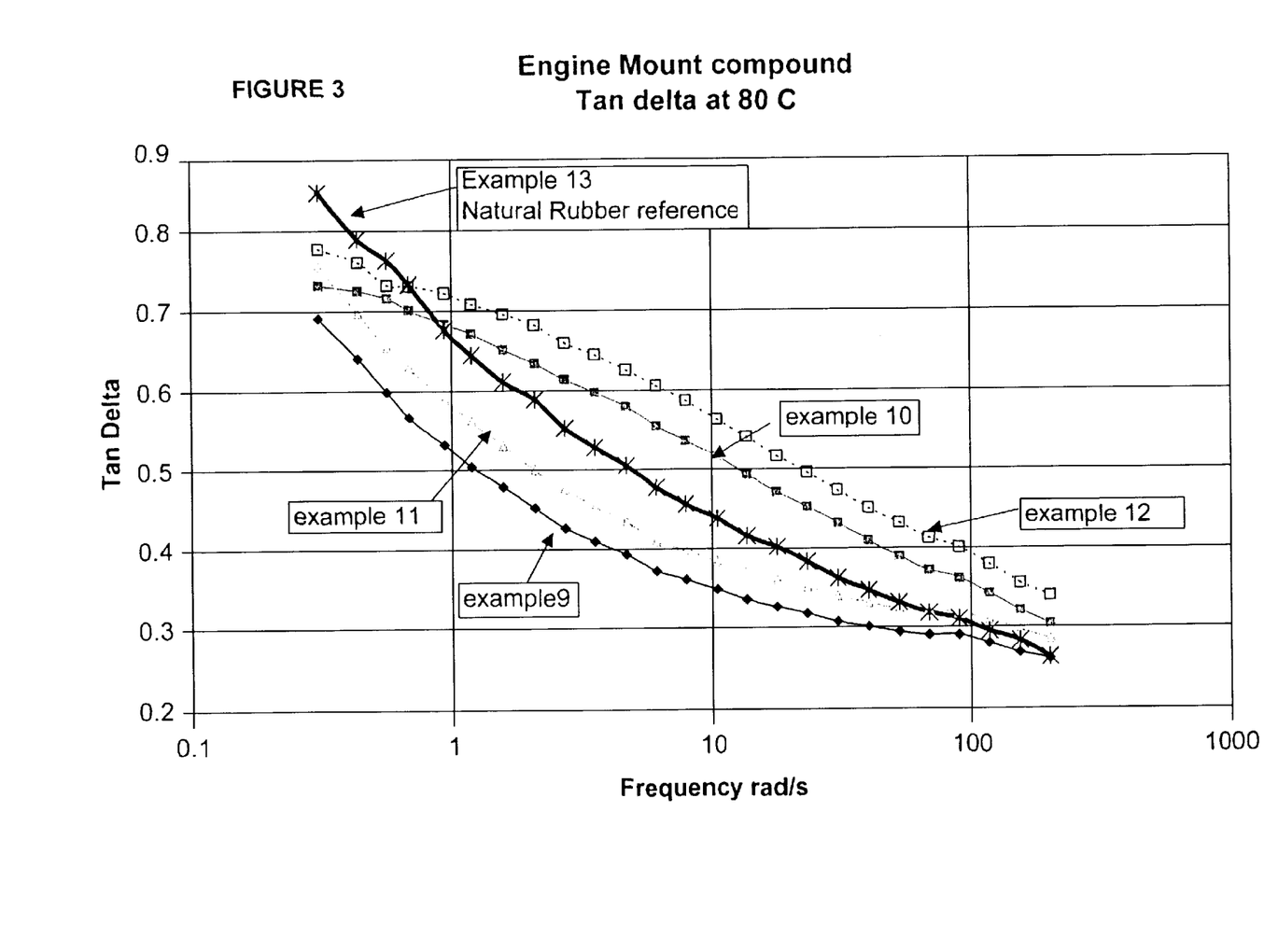

Examples 10 and 12 based on the polymer of comparative Example h, at all deformation rates, and a lower stiffness. It appears close to even more elastic than the compound of Example 13 based on natural rubber polymer of comparative Example j, as seen from the tan delta values of Table 6, and like illustrated in FIG. 3.

Dynamic Testing of Cured Rubber Compounds

Dynamic testing was performed on the cured rubber samples of Examples 9–13 using a Dynamic Characterization Testing equipment MTS model 790.13 under the following testing conditions: A rubber part of 40×40×20 mm was compression molded and cured for 10 minutes at 180°

TABLE 5

Physical Properties

| | Example 9 40 phr C.B. | Example 10 40 phr C.B | Example 11 60 phr C.B | Example 12 60 phr C.B | Example 13 Natural Rubber |
|---|---|---|---|---|---|
| MONSANTO ODR, 180° C., ±3° arc | | | | | |
| ML, dNm | 12.1 | 8.3 | 10.4 | 6.2 | 5.3 |
| MH, dNm | 65.1 | 75.4 | 60.1 | 66.2 | 72.3 |
| Ts2, m.m | 1.34 | 1.41 | 1.68 | 1.71 | 0.88 |
| Tc90, m.m | 4.61 | 3.93 | 4.83 | 4.15 | 1.45 |
| Peak Rate(dNm/min) | 28 | 49 | 29 | 45 | 275 |
| MOONEY VISCOSITY 100° C., ML 1 + 4 | 61 | 49 | 51 | 40 | 36 |
| PHYSICAL PROPERTIES, PRESS CURE 180° C., 7 min./5 min. for NR | | | | | |
| Hardness | 52/50 | 53/52 | 50/50 | 52/51 | 51/50 |
| Modulus 100%, MPa | 1.5 | 1.4 | 1.4 | 1.6 | 1.4 |
| Tensile Strength, MPa | 6.6 | 8.3 | 8.3 | 7.8 | 24.2 |
| Elongation @ break, % | 408 | 446 | 499 | 415 | 579 |
| TEAR RESISTANCE ASTM C, kN/m | 23 | 31 | 30 | 27 | 48 |
| COMPRESSION SET, 22 hrs, 70° C. DIN, PRESS CURE 180° C., 8 min. | | | | | |
| % | 18 | 14 | 16 | 18 | 13 |

The dynamic properties of the uncured compounds were evaluated on a RPA 2000 at 80 C and are described in Table 6.

C. in a hot press. A compression pre-load of 800N was then applied on the specimen. The test was run for 300 seconds after a 300 seconds stabilization period.

TABLE 6

Dynamic Properties of Examples 9 to 13 Uncured Compounds

| Polymer example | Example 9 7 40 phr C.B. | Example 10 h 40 phr C.B | Example 11 7 60 phr C.B | Example 12 h 60 phr C.B | Example 13 j Natural Rubber |
|---|---|---|---|---|---|
| RPA at 80° C., 13.95% strain | | | | | |
| G' at 1 rad/sec., kPa | 170 | 118 | 137 | 94 | 99 |
| G' at 10 rad/sec. Kpa | 307 | 278 | 256 | 223 | 202 |
| G' at 100 rad/sec. Kpa | 447 | 485 | 380 | 405 | 306 |
| Stiffness [G' @ 100 rad/s/G' @ 10 rad/s)] | 1.46 | 1.74 | 1.48 | 1.82 | 1.51 |
| Tan delta at 1 rad./s | 0.53 | 0.68 | 0.59 | 0.72 | 0.68 |
| Tan delta at 10 rad./s. | 0.35 | 0.52 | 0.38 | 0.57 | 0.44 |
| Tan delta at 100 rad./s | 0.29 | 0.36 | 0.32 | 0.40 | 0.31 |

As seen from the results of Table 6, in the uncured form, the compounds 9 and 11 based on the polymer of Example 7 exhibit a higher elastic modulus than the compounds of The deformation exerted on the rubber part is 0.5 mm at a frequency of 15 Hz, and 0.05 mm at a frequency of 100 Hz.

G'=elastic modulus
G"=viscous modulus
Stiffness is defined as ratio of the 2 elastic moduli: G' (100 Hz) over G' (15 Hz).

The data of Table 7 indicate that the EPDM according to the present invention has dynamic properties at least similar to a conventional EPDM (comparative Example h). It also has a slightly lower stiffness at elevated temperature (100° C.). (Examples 11 and 12)

TABLE 7

Dynamic Properties of Examples 9–13 Cured Compounds

|  | Example 9 40 phr C.B. | Example 10 40 phr C.B | Example 11 60 phr C.B | Example 12 60 phr C.B | Example 13 Natural Rubber |
|---|---|---|---|---|---|
| Temperature 26° C., Frequency 15 Hz, pre-load 800N, amplitude 0.5 mm |  |  |  |  |  |
| G', N/mm | 561 | 625 | 613 | 652 | 662 |
| G", N.sec/mm | 0.54 | 0.58 | 0.88 | 0.81 | 0.53 |
| Loss tangent (15 Hz), % | 9.1 | 8.8 | 13.6 | 11.7 | 7.5 |
| Temperature 26° C., Frequency 100 Hz, pre-load 800N, amplitude 0.05 mm |  |  |  |  |  |
| G', N/mm | 680 | 756 | 861 | 862 | 826 |
| G", N.sec/mm | 0.11 | 0.11 | 0.17 | 0.15 | 0.03 |
| Loss tangent (100 Hz), % | 10.1 | 9.1 | 12.6 | 10.9 | 6.2 |
| Stiffness G' 100 Hz/15 Hz | 1.21 | 1.21 | 1.40 | 1.32 | 1,25 |
| Temperature 100° C., Frequency 15 Hz, pre-load 800N, amplitude 0.5 mm |  |  |  |  |  |
| G', N/mm | 517 | 586 | 554 | 523 | 563 |
| G", N.sec/mm | 0.26 | 0.29 | 0.36 | 0.38 | 0.23 |
| Loss tangent (15 Hz), % | 4.8 | 4.7 | 6.1 | 6.9 | 3.9 |
| Temperature 100° C., Frequency 100 Hz, pre-load 800N, amplitude 0.05 mm |  |  |  |  |  |
| G', N/mm | 584 | 658 | 650 | 643 | 636 |
| G", N.sec/mm | 0.048 | 0.056 | 0.068 | 0.07 | 0.035 |
| Loss tangent (100 Hz), % | 5.2 | 5.3 | 6.5 | 6.9 | 3.5 |
| Stiffness G' 100 Hz/15 Hz | 1.13 | 1.12 | 1.17 | 1.23 | 1.13 |

The above Examples demonstrate that it is possible to modify EPDM materials so as to increase their resilience while still improving their processability at higher molecular weights. Depending on the end-use application, processability improvements can be favored by adding increasing the proportion of the low molecular weight component or by decreasing its molecular weight or by using extender oil.

While the present invention has been described in considerable detail with reference to certain preferred versions thereof, other versions are possible. For example, while the compositions described herein are preferably used for or with automobile sealing systems, other uses are not excluded. Also, different types of members and configurations of members can be formed in accordance with the invention, in a number of different ways that will be apparent to persons having ordinary skill in the art. Therefore, the spirit and scope of the appended claims should not be limited to the description of the preferred versions contained herein.

All patents, test procedures, and other documents cited herein, including priority documents, are fully incorporated by reference for all jurisdictions in which such incorporation is permitted and to the extent they are not inconsistent with this specification. Although dependent claims have single dependencies in accordance with U.S. practice, each of the features in any of the dependent claims can be combined with each of the features of one or more of the other dependent claims dependent upon the same independent claim or claims.

What is claimed is:

1. A solid multimodal polymer composition comprising units derived from ethylene, alpha-olefin and diene, the polymer composition comprising:
   a) at least 50 weight percent based on the total polymer weight of a first fraction having a Mooney viscosity of over 120 (1+4@125° C.); and
   b) from 5 to 50 weight percent based on the total polymer weight of a second fraction having a Mooney viscosity of 120 or less (1+4@125° C.) and a Mn of at least 3500 g/mol,
   wherein the polymer composition has a tan ($\delta$) of 0.5 or less when measured at 125° C. and at a frequency of 10.4 rad/sec, and an overall Mooney viscosity of at least 30(1+4@125° C.).

2. The composition of claim 1 wherein the polymer composition has an overall Mooney viscosity of at least 60(1+4@125° C.).

3. The composition of claim 1 wherein the second fraction has a Mn of at least 25000 g/mol.

4. The composition of claim 1 wherein the second fraction has a Mv of at least 9000 g/mol.

5. The composition of claim 1 wherein the tan ($\delta$) is between 0.1 and 0.4.

6. The composition of claim 1 wherein the tan ($\delta$) is 0.45 or less.

7. The composition of claim 1 wherein the overall Mooney viscosity is from 30 to 100(1+4@125° C.).

8. The composition of claim 1 comprising from 35 to 90 mole percent ethylene derived units, from 0.2 to 5.0 mole percent non-conjugated diene derived units, and the remainder of the polymer units derived from propylene.

9. The composition of claim 1 comprising at least 70 weight percent based on the total polymer weight of a first fraction having a Mooney viscosity of over 120 (1+4@125° C.), and from 5 to 30 weight percent based on the total polymer weight of a second fraction having a Mooney viscosity of 120 or less (1+4@125° C.) and a Mn of at least 3500 g/mol.

10. The composition of claim 1 comprising at least 70 weight percent based on the total polymer weight of a first fraction having a Mooney viscosity of over 120 (1+4@125° C.), and from 5 to 30 weight percent based on the total polymer weight of a second fraction having a Mooney viscosity of 120 or less (1+4@125° C.) and a Mv at least 9000 g/mol.

11. The composition of claim 1 wherein the first fraction has a Mooney viscosity of at least 175 (1+4@125° C.), and the second fraction has a Mooney viscosity below 50 (1+4@125° C.) and a Mn above 3500 g/mol.

12. The composition of claim 1 wherein the first fraction has a Mooney viscosity of at least 175 (1+4@125° C.), and the second fraction has a Mooney viscosity below 50 (1+4@125° C.) and a Mv of at least 9000 g/mol.

13. The composition of claim 1 wherein the polymer composition is essentially free of oil additive.

14. The composition of claim 1 wherein the polymer composition contains less than 30 parts by weight oil per 100 parts by weight polymer.

15. The composition of claim 1 wherein the polymer composition contains less than 20 parts by weight oil per 100 parts by weight polymer.

16. The composition of claim 1 wherein the polymer composition contains less than 10 parts by weight oil per 100 parts by weight polymer.

17. The composition of claim 1 wherein the polymer composition has a branching index of at least 0.7.

18. The composition of claim 1 wherein the polymer composition has a branching index of at least 0.8.

19. The composition of claim 1 wherein both the first and second fractions have a molecular weight distribution of 4.0 or less.

20. The composition of claim 1 wherein both the first and second fractions have a molecular weight distribution of 3.0 or less.

21. The composition of claim 1 wherein both the first and second fractions have a molecular weight distribution of 2.5 or less.

22. The composition of claim 1 wherein the first fraction comprises less than 78 wt % of ethylene derived units based on the total weight of ethylene and alpha-olefin.

23. The composition of claim 1 wherein the first fraction comprises less than 72 wt % of ethylene derived units based on the total weight of ethylene and alpha-olefin.

24. The composition of claim 1 wherein the first fraction comprises less than 65 wt % of ethylene derived units based on the total weight of ethylene and alpha-olefin.

25. The composition of claim 1 wherein the first and second fractions comprise less than 15 wt % of diene based on the total weight of 15 ethylene, alpha-olefin, and diene.

26. The composition of claim 1 wherein the first and second fractions comprise less than 12 wt % of diene based on the total weight of ethylene, alpha-olefin, and diene.

27. The composition of claim I wherein the first and second fractions comprise less than 10 wt % of diene based on the total weight of ethylene, alpha-olefin, and diene.

28. The composition of claim 1 wherein the amount (wt %) of ethylene derived units in the first and second fraction differ by no more than 20%.

29. The composition of claim 1 wherein the amount (wt %) of ethylene derived units in the first and second fraction differ by no more than 10%.

30. A solid multimodal polymer composition comprising units derived from ethylene, alpha-olefin and diene, the polymer comprising:

a) at least 60 weight percent based on the total polymer weight of a first fraction having a Mooney viscosity of over 120 (1+4@125° C.); and b) from 5 to 40 weight percent based on the total polymer weight of a second fraction having a Mooney viscosity of 120 or less (1+4@125° C.) and a Mn of at least 3500 g/mol, wherein the polymer composition has a tan (δ) of 0.5 or less when measured at 125° C. and at a frequency of 10.4 rad/sec, and an overall Mooney viscosity of at least 30 (1+4@125° C.).

31. The composition of claim 30 wherein the second fraction has a Mv of at least 9000 g/mol.

32. The composition of claim 30 wherein the overall Mooney viscosity is from 30 to 100 (1+4@125° C.).

33. The composition of claim 30 comprising from 35 to 90 mole percent ethylene derived units, from 0.2 to 5.0 mole percent non-conjugated diene derived units, and the remainder of the polymer units derived from propylene.

34. The composition of claim 30 comprising at least 70 weight percent based on the total polymer weight of a first fraction having a Mooney viscosity of over 120 (1+4@125° C.), and from 5 to 30 weight percent based on the total polymer weight of a second fraction having a Mooney viscosity of 120 or less (1+4@125° C.) and a Mv at least 9000 g/mol.

35. The composition of claim 30 wherein the polymer is essentially free of oil additive.

36. The composition of claim 30 wherein both the first and second fractions have a molecular weight distribution of 4.0 or less.

37. The composition of claim 30 wherein both the first and second fractions have a molecular weight distribution of 3.0 or less.

38. The composition of claim 30 wherein the amount (wt %) of ethylene derived units in the first and second fraction differ by no more than 10%.

39. A solid multimodal polymer composition comprising units derived from ethylene, alpha-olefin and diene, the polymer composition comprising:

a) at least 50 weight percent based on the total polymer weight of a first fraction having a Mooney viscosity of over 120 (1+4@125° C.) and a molecular weight distribution of 3.0 or less; and b) from 5 to 50 weight percent based on the total polymer weight of a second fraction having a Mooney viscosity of 120 or less (1+4@125° C.), a molecular weight distribution of 3 or less, and a Mn of at least 25000 g/mol, wherein the polymer composition has a tan (δ) of 0.5 or less when measured at 125° C. and at a frequency of 10.4 rad/sec, and an overall Mooney viscosity of at least 30 (1+4@125° C.).

40. The composition of claim 39 comprising over 50 wt % of the first fraction.

41. The composition of claim 39 wherein the overall Mooney viscosity is from 30 to 100 (1+4@125° C.).

42. The composition of claim 39 comprising from 35 to 90 mole percent ethylene derived units, from 0.2 to 5.0 mole percent non-conjugated diene derived units, and the remainder of the polymer units derived from propylene.

43. The composition of claim 39 comprising at least 70 weight percent based on the total polymer weight of a first fraction having a Mooney viscosity of over 120 (1+4@125° C.), and from 5 to 30 weight percent based on the total polymer weight of a second fraction having a Mooney viscosity of 120 or less (1+4@125° C.) and a Mv at least 9000 g/mol.

44. The composition of claim 39 wherein the polymer is essentially free of oil additive.

45. The composition of claim 39 wherein the amount (wt %) of ethylene derived units in the first and second fraction differ by no more than 10%.

46. A multimodal polymer composition comprising from 40 to 90 mole percent ethylene derived units, from 0.2 to 5.0 mole percent non-conjugated diene derived units, and the remainder of the polymer units comprised of propylene derived units; said polymer composition being essentially free of oil additive and having a tan($\delta$) less than 0.5 when measured at 125° C. and at a frequency of 10.4 rad/sec, an overall Mooney viscosity of from 30 to 100 (1+4@125° C.), a branching index of at least 0.7, and said polymer composition comprising:
   a) at least 50 weight percent based on the total polymer weight of a first fraction having a Mooney viscosity of over 120 (1+4@125° C.) and a molecular weight distribution of 3 or less; and
   b) from 5 to 50 weight percent based on the total polymer weight of a second fraction having a Mooney viscosity lower than 120 (1+4@125° C.), a Mn of at least 3500 and a molecular weight distribution of 3 or less; and
   wherein the amount (wt %) of ethylene derived units in the first and second fraction differ by no more than 20%.

47. The composition of claim 46 wherein the second fraction has a Mv of at least 9000 g/mol.

48. The composition of claim 46 wherein the tan ($\delta$) is between 0.1 and 0.4.

49. The composition of claim 46 wherein the tan ($\delta$) is 0.45 or less.

50. The composition of claim 46 comprising from 35 to 90 mole percent ethylene derived units, from 0.5 to 2.5 mole percent non-conjugated diene derived units, and the remainder of the polymer units derived from propylene.

51. The composition of claim 46 comprising at least 70 weight percent based on the total polymer weight of a first fraction having a Mooney viscosity of over 120 (1+4@125° C.), and from 5 to 30 weight percent based on the total polymer weight of a second fraction having a Mooney viscosity of 120 or less (1+4@125° C.) and a Mn at least 3500 g/mol.

52. The composition of claim 46 comprising at least 70 weight percent of a first fraction having a Mooney viscosity of over 120 (1+4@125° C.), and from 5 to 30 weight percent based on the total polymer weight of a second fraction having a Mooney viscosity of 120 or less (1+4@125° C.) and a Mv at least 9000 g/mol.

53. The composition of claim 46 wherein the first fraction has a Mooney viscosity of at least 175 (1+4@125° C.), and the second fraction has a Mooney viscosity below 50 (1+4@125° C.) and a Mn above 3500 g/mol.

54. The composition of claim 46 wherein the first fraction has a Mooney viscosity of at least 175 (1+4@125° C.), and the second fraction has a Mooney viscosity below 50 (1+4@125° C.) and a Mv of at least 9000 g/mol.

55. The composition of claim 46 wherein the polymer contains less than 20 parts by weight oil per 100 parts by weight polymer.

56. The composition of claim 46 wherein the polymer contains less than 30 parts by weight oil per 100 parts by weight polymer.

57. The composition of claim 46 wherein the polymer contains less than 10 parts by weight oil per 100 parts by weight polymer.

58. The composition of claim 46 wherein the polymer has a branching index of at least 0.8.

59. The composition of claim 46 wherein both the first and second fractions have a molecular weight distribution of 2.5 or less.

60. The composition of claim 46 wherein the amount (wt %) of ethylene derived units in the first and second fraction differ by no more than 10%.

61. A process for the preparation of multimodal polymer composition comprising: contacting in a first reactor activated metallocene catalyst with ethylene, diene and propylene monomers thereby producing an effluent containing a first polymer component; feeding the effluent to a second reactor wherein activated metallocene catalyst is contacted with additional ethylene, diene and propylene monomers to produce a second polymer component and final product; and controlling conditions in each reactor in order to obtain a first polymer component having a Mooney viscosity of over 120 (1+4@125° C.) and a second polymer component having a Mooney viscosity of 120 or less (1+4@125° C.) and a Mn of at least 3500 g/mol, and the final product has tan ($\delta$) of 0.5 or less when measured at 125° C. and at a frequency of 10.4 rad/sec, has an overall Mooney viscosity of at least 30 (1+4@125° C.), and contains no more of the second polymer component than the first polymer component.

62. The process of claim 61 wherein the second polymer component has a Mv of at least 9000 g/mol.

63. The process of claim 61 wherein the final product tan ($\delta$) is between 0.1 and 0.4.

64. The process of claim 61 wherein the final product tan ($\delta$) is 0.45 or less.

65. The process of claim 61 wherein the final product Mooney viscosity is from 30 to 100 (1+4@125° C.).

66. The process of claim 61 wherein the final product comprises from 35 to 90 mole percent ethylene derived units, from 0.2 to 5.0 mole percent non-conjugated diene derived units, and the remainder of the polymer units derived from propylene.

67. The process of claim 61 wherein the first component has a Mooney viscosity of at least 175 (1+4@125° C.), and the second component has a Mooney viscosity below 50 (1+4@125° C.) and a Mn above 3500 g/mol.

68. The process of claim 61 wherein the final product has a branching index of at least 0.7.

69. The process of claim 61 wherein the final product has a branching index of at least 0.8.

70. The process of claim 61 wherein the amount (wt %) of ethylene derived units in the first and second components differ by no more than 20%.

71. The process of claim 61 wherein the amount (wt %) of ethylene derived units in the first and second components differ by no more than 10%.

72. A vibration damping device comprising a multimodal polymer composition containing units derived from ethylene, alpha-olefin and diene, said polymer composition having a tan ($\delta$) of 0.5 or less when measured at 125° C. and at a frequency of 10.4 rad/sec, and an overall Mooney viscosity of at least 30 (1+4@125° C.); said polymer comprising:
   a) at least 50 weight percent based on the total polymer weight of a first fraction having a Mooney viscosity of over 120 (1+4@125° C.); and
   b) from 5 to 50 weight percent based on the total polymer weight of a second fraction having a Mooney viscosity of 120 or less (1+4@125° C.) and a Mn of at least 3500 g/mol.

73. The device of claim 72 wherein the second fraction has a Mv of at least 9000 g/mol.

74. The device of claim 72 wherein the tan (δ) is between 0.1 and 0.4.

75. The device of claim 72 wherein the tan (δ) is 0.45 or less.

76. The device of claim 72 wherein the overall Mooney viscosity is from 30 to 100 (1+4@125° C.).

77. The device of claim 72 comprising from 35 to 90 mole percent ethylene derived units, from 0.2 to 5.0 mole percent non-conjugated diene derived units, and the remainder of the polymer units derived from propylene.

78. The device of claim 72 comprising at least 70 weight percent of a first fraction having a Mooney viscosity of over 120 (1+4@125° C.), and from 5 to 30 weight percent based on the total polymer weight of a second fraction having a Mooney viscosity of 120 or less (1+4@125° C.) and a Mn at least 3500 g/mol.

79. The device of claim 72 comprising at least 70 weight percent of a first fraction having a Mooney viscosity of over 120 (1+4@125° C.), and from 5 to 30 weight percent based on the total polymer weight of a second fraction having a Mooney viscosity of 120 or less (1+4@125° C.) and a Mv at least 9000 g/mol.

80. The device of claim 72 wherein the first fraction has a Mooney viscosity of at least 175 (1+4@125° C.), and the second fraction has a Mooney viscosity below 50 (1+4@125° C.) and a Mn above 3500 g/mol.

81. The device of claim 72 wherein the first fraction has a Mooney viscosity of at least 175 (1+4@125° C.), and the second fraction has a Mooney viscosity below 50 (1+4@125° C.) and a Mv of at least 9000 g/mol.

82. The device of claim 72 wherein the polymer is essentially free of oil additive.

83. The device of claim 72 wherein the polymer contains less than 30 parts by weight oil per 100 parts by weight polymer.

84. The device of claim 72 wherein the polymer contains less than 20 parts by weight oil per 100 parts by weight polymer.

85. The device of claim 72 wherein the polymer contains less than 10 parts by weight oil per 100 parts by weight polymer.

86. The device of claim 72 wherein the polymer has a branching index of at least 0.7.

87. The device of claim 72 wherein the polymer has a branching index of at least 0.8.

88. The device of claim 72 wherein both the first and second fractions have a molecular weight distribution of 3.0 or less.

89. The device of claim 72 wherein both the first and second fractions have a molecular weight distribution of 2.5 or less.

90. The device of claim 72 wherein the amount (wt %) of ethylene derived units in the first and second fraction differ by no more than 20%.

91. The device of claim 72 wherein the amount (wt %) of ethylene 15 derived units in the first and second fraction differ by no more than 10%.

* * * * *